: 3,522,229
GLYCOPROTEIN FROM SALIVA OR SALIVARY
GLANDS HAVING GASTRIC ACID SECRETION
INHIBITORY AS WELL AS ANTI-ULCERATIVE
ACTIVITY AND METHOD OF COLLECTING
THE SAME
Masaaki Yamamoto and Masayoshi Kobayashi, Kawasaki-shi, and Tokutaro Miki, Tokyo, Japan, assignors to Teikoku Hormone Mfg. Co., Ltd., Tokyo, Japan, a corporation of Japan
No Drawing. Filed Mar. 25, 1968, Ser. No. 715,579
Claims priority, application Japan, Mar. 29, 1967, 42/19,209; Mar. 15, 1968, 43/16,517
Int. Cl. A61k 17/00; C07g 7/00
U.S. Cl. 260—112                                                                                      16 Claims

ABSTRACT OF THE DISCLOSURE

A glycoprotein having gastric acid secretion inhibitory and anti-ulcerative activity, obtained from saliva or salivary glands. A method of collecting the glycoprotein which comprises in combination steps of acidifying saliva or an aqueous extraction of salivary glands to pH 4.0 stepwise, adding zinc salt to mother liquor to precipitate complex, redissolving the precipitate by chelating agent, subjecting to dialyzation, and adding water-miscible organic solvent to precipitate the glycoprotein.

This invention relates to a new glycoprotein having gastric acid secretion inhibitory as well as anti-ulcerative activity and a method of collecting said glycoprotein from saliva or salivary glands.

It is well known that the gastric juice of animals contains gastrone, a substance which demonstrates gastric acid secretion inhibitory activity. It is also pointed out that a similar activity is also present in saliva, the external secretion of the same alimentary canal. Namely, Code et al. have pointed out the presence of an antigastric acid secretory activity in the saliva of human and canine (Fed. proc. 8, 26, 1949).

While it was thus known to date that saliva contained a gastric acid secretion inhibitory substance, the essence of the effective substance as well as its isolation was not known as yet and, furthermore, it was also unknown to date that this substance had an anti-ulcerative activity.

We succeeded in isolating a new glycoprotein from the saliva of man and mammals and also found that this new glycoprotein not only had a pronounced gastric acid secretion inhibitory activity but also had a therapeutic activity on gastric ulcers, as well as an inhibitory activity on their development. It was also found that the aforesaid new glycoprotein could also be isolated readily from the salivary glands of mammals.

An object of this invention is to provide a new glycoprotein which is of value in the therapy of gastric hyperacidity and ulcerous disorders. Another object is to provide a new glycoprotein which is in a purified form suitable for administration to the human body and moreover possesses pronounced gastric acid secretion inhibitory as well as antiulcerative activity. A further object is to provide a commercially feasible method of isolating the aforesaid glycoprotein in a purified form from saliva and salivary glands.

This invention is to provide a method of collecting a glycoprotein having gastric acid secretion inhibiting activity and antiulcerative activity, the method being characterized by acidifying an aqueous extraction of saliva or salivary glands to eliminate impure proteins having isoelectric points of about from pH 5.4 to pH 5.6 and about from pH 4.0 to pH 4.6, adding a water-soluble zinc salt to the resulting mother liquor to precipitate a complex of the zinc salt and proteins, adding a chelating agent for zinc to the so formed precipitates, redissolving the precipitates into an aqueous medium, subjecting the so obtained solution to a dialyzing treatment to eliminate the chelate of zinc, and thereafter carrying out the following procedures (a) and (b) singly or in combination:

(a) Adding a water-miscible organic solvent to the dialysate while adjusting its concentration up to 30 volume percent to eliminate precipitated inactive proteins and then adding the water-miscible organic solvent to the filtrate while adjusting its concentration up to 60 volume percent to precipitate effective substances, and/or (b) Adding a sulfate of ammonia or an alkali metal to the dialysate while adjusting its concentration up to 0.5 saturation, collecting the so formed precipitates and subjecting the precipitates to a dialyzing treatment to eliminate the sulfate.

As the saliva, useable, besides the as-obtained saliva of man and mammals, are such as saliva concentrated to one-half to one-fifth of its original volume, powdered saliva obtained by adding such as acetone or alcohol to saliva or concentrated saliva followed by making precipitates therefrom and drying the precipitates, or powdered saliva obtained by drying the as-obtained saliva or concentrated saliva by a drying technique by which the activity thereof is not impaired, such as direct spray drying or freezing and drying. The term "saliva," as used herein and in the appended claims, will include the foregoing concentrated saliva as well as the aqueous solution of the aforesaid powdered saliva.

While as the salivary glands, either the sublingual, submaxillary or parotid glands of mammals can be used, the preferred ones are those which abound in mucus, such as the sublingual and submaxillary glands, the parotid gland being somewhat inferior with respect to the yield of the glycoprotein. These glands are used ground or as a dried powder thereof. In the present invention, mixtures of sublingual glands, submaxillary glands and parotid glands can be also used.

As the source of saliva or salivary glands of mammals, useable are those of the ungulate animals such as bovine, equine, swine and ovine, and mammals other than the ungulate animals, such as canine, cats, rabbits, mice and whales.

The aforesaid salivary glands are made into a liquid extract by extraction in an aqueous medium showing a pH 6–8 such, for example, as water, a weakly alkaline water or saline, after removing, if desired, the fat from the glands.

The resulting liquid extract of saliva or salivary glands, in its as-obtained state or, if necessary, after being submitted to a solid-liquid separation operation such as filtration or centrifuging to eliminate the insoluble portion therefrom, is acidified to thereby precipitate the impure proteins having isoelectric points of about from pH 5.4 to pH 5.6 and about from pH 4.0 to pH 4.6. As the acid to be used, conveniently useable are the inorganic acids such as hydrochloric, sulfuric and hydrobromic acids. The preferred procedure is to first adjust its pH to 5.4–5.6 and remove the precipitates separating out and thereafter adjusting the pH of the supernatant to 4.5–4.6 and again removing the resulting precipitates. In this manner, most of the ineffective protein substance, including the parotins, are removed and a clear mother liquor is obtained. For example, it is disclosed in the Ann. New York Acad. Sci., 85 Art. 1, pp. 228–310 (1960) that when the pH is adjusted to either 5.4 or 4.6 in the step of extracting parotin and salivaparotin from saliva or salivary glands, they are separated out as isoelectric point precipitates at respective foregoing pH value, but in the case of the invention glycoprotein it does not precipitate out but remains behind in the upper layer mother liquor.

Again, it is known that, as other substances similar to parotin, alpha-parotin Endocrinol. Japan, 12, 69,249 (1965) and beta-parotin Endocrinol. Japan, 12, 69,249 (1965) are obtained from the parotid gland, while S-parotin Ann. N.Y. Acad. Sci., 85, Art. 1, pp. 228–310 (1960) is obtained from the submaxillary gland. Further, as a substance similar to salivaparotin, salivaparotin-A has been extracted from saliva (Ann. N.Y. Acad. Sci., 85, Art. 1, pp. 228–310, 1960). The alpha-parotin and S-parotin are, however, separated out as isoelectric point precipitates at either pH 5.4 or pH 4.5–4.6 as in the case of parotin. Hence, they can be separated from the invention glycoprotein in the hereinbefore described treatment step. Salivaparotin-A is a low molecular weight protein which can only be obtained by hot extraction with glacial acetic acid and does not contain any sugar at all. Again, parotin and S-parotin are also simple proteins which do not contain any sugar and are clearly distinguishable from the invention glycoprotein. On the other hand, beta-parotin is a substance which can only be obtained by autolysing the parotid gland at 37° C. and it only contains about 3% of sugar. It thus is clearly different from the invention glycoprotein.

The precipitated ineffective protein substances are separated from the mother liquor containing the glycoprotein of the invention by an optional solid-liquid separation operation such, for example, as filtration, centrifugation or decantation.

A water-soluble zinc salt is added to the resulting mother liquor and the precipitates of a complex of the zinc salt and protein are formed. The mucoid present in the saliva or salivary glands remains in the liquor. As the water-soluble zinc salt, any salt may be used so long as it is one in which a soluble chelate salt can be formed by chelating when the zinc in the zinc-protein complex is acted upon by the chelating agent, zinc salts conveniently used in the invention include zinc chloride, zinc bromide, zinc acetate and the like. The zinc salt is added to the mother liquor to make its zinc concentration in the latter becomes 0.01–0.05 mole. Normally, a 0.1–0.5 mole aqueous solution of the zinc salt is added at a neutral pH in an amount one-tenth that of the mother liquor. The resulting zinc-protein complex precipitates are separated by an optional solid-liquid separation operation such, for example, as filtration or centrifugation. In this case, a water-miscible organic solvent such as acetone or methanol can be mixed for accelerating the sedimentation of the complex.

Next, a chelating agent of zinc is added to act on the resulting precipitates and then the precipitates are redissolved in either water or other aqueous media. As the chelating agent of zinc, any of those known such, for example, as hydroxy acids, keto acids, keto-acids esters, beta-diketone, amino acids, nitrolotriacetic acid and ethylenediamine tetraacetic acid can be used. Chelating agents which are particularly suitable for use in this invention are sodium citrate, glycine and EDTA. It is, of course, to be desired that the chelating agent is added in an amount equivalent to or greater than the zinc.

This is followed by submitting the resulting solution to dialysis to eliminate the chelate of zinc and thereby obtaining a dialysate containing the glycoprotein of the invention. The dialysis, which is performed in accordance with the method which is known per se, is carried out readily by dialyzing the redissolved solution obtained in the hereinbefore described step against running water through the intermediary of a dialytic membrane such as cellophane.

The so obtained dialysate is a liquor containing mainly effective substances. For the purpose of collecting the effective substances in more purified forms, preferably after addition of a small amount of sodium chloride, a water-miscible organic solvent such as acetone and ethanol is added to the dialysate to make the concentration thereof is adjusted up to 30%. Next, unnecessary precipitates formed by the addition of said solvent are eliminated by means of centrifugal separation and to the supernatant fluid is added the same organic solvent while the concentration thereof is adjusted between 30 to 60%, and in the consequence, the intended active substances of the present invention are obtained.

In the case of using only submaxillary glands or mixed saliva and/or mixed glands, it is preferred to add a sulfate of ammonium or an alkali metal while adjusting its concentration up to 0.5 saturation and collect the resulting precipitates. As the sulfate of alkali metals, useable are sodium sulfate and potassium sulfate, but the use of ammonium sulfate is to be most preferred. The effective glycoprotein of the invention can be separated out as precipitates at this time while, on the other hand, the other protein substances remain behind in the solution.

Namely, in the case of the submaxillary gland, the liquid extract contains the nervous growth promoting factor (NGF) and, as in the case of the invention glycoprotein, the NGF is also separated as zinc complex precipitates.

However, since NGF can be precipitates by fractional precipitation procedure with sulfate in the concentration 0.5 and 0.71 saturation (24–33 w./w. percent), but can not be precipitated in the concentration below 0.5 saturation and remained in the supernatant, it can be distinguished from this invention glycoprotein. Furthermore, NGF is distinguished from this invention substance in respect of a simple protein not containing any sugar.

When these precipitates obtained with the 0.5 saturation of a sulfate is dissolved in water, removed of its sulfate by dialyzing by the same technique as hereinbefore described, and thereafter the dialysate is frozen and dried, the purified effective glycoprotein of the invention is obtained. However, the more purified glycoprotein can be obtained by adopting both said treatments with an water-missible organic solvent and said sulfate fractional procedure in combination.

The yields of the invention purified glycoprotein from the various starting materials are, generally speaking, as follows: 100 mg. per liter from saliva, 1000 mg. per kg. from sublingual gland, 700 mg. per kg. from submaxillary gland and 100 mg. per kg. from parotid gland, there being a tendency that the purified glycoprotein from the glands being somewhat inferior to that obtained from saliva in purity and also slightly lower in activity.

The foregoing glycoprotein obtained by the invention method is fully purified and moreover has a pronounced gastric acid secretion inhibitory as well as anti-ulcerative activity and hence can be used for the various gastric disorders in a form suitable for oral administration or injection. Again, since this glycoprotein is readily water soluble, it can be further homogenized by the customary techniques of purifying proteins. The most preferred techniques are the ion-exchange chromatography, the gel filtration technique and the starch block electrophoresis, which may be used singly or in combination.

When the purified glycoproteins obtained from various starting materials are further more homogenized, homogenized glycoproteins similar activity and composition.

The homogenized glycoprotein is a non-dialyzable high molecular weight glycoprotein having a molecular weight of above 150,000. Its elemental analysis values are: H=7.68%, C=42.31%, N=9.15%, and it is composed of 34.9% sugar and 62.6% peptide. It has the maximum absorption in the ultraviolet region at 280 mμ and the extinction coefficient at said wavelength is $$E^{1\%}_{1\,cm.} = 4.67$$

The isoelectric point measured by electrophoresis with acetylcellulose membrane as carrier shows a pH of 2.6.

Further, the analytical results of the sugars and amino acids composition are as shown in Table I.

TABLE I.—AMINO ACIDS AND SUGARS COMPOSITION OF THE HOMOGENIZED NOVEL GLYCOPROTEIN

|  | Amino Acid | | Sugar, mg./g. |
|---|---|---|---|
|  | M.mol./g. | Mg./g. |  |
| Lysine | 0.39 | 50 |  |
| Histidine | 0.11 | 15 |  |
| Arginine | 0.19 | 30 |  |
| Asparatic acid plus Asparagine | 0.52 | 60 |  |
| Glutamic acid plus Glutamine | 0.37 | 41 |  |
| Threonine | 0.30 | 26 |  |
| Serine | 0.67 | 89 |  |
| Proline | 0.28 | 27 |  |
| Glycine | 0.26 | 15 |  |
| Alanine | 0.47 | 33 |  |
| Valine | 0.39 | 9 |  |
| Isoleucine | 0.13 | 15 |  |
| Leucine | 0.40 | 45 |  |
| Tyrosine | 0.15 | 24 |  |
| Phenylalanine | 0.20 | 29 |  |
| Cystine | 0.08 | 18 |  |
| Tryptophan | 0.12 | 22 |  |
| Galactose |  |  | 245 |
| Fucose |  |  | 41 |
| Glucosamine |  |  | 55 |
| Sialic acid |  |  | 8 |
| Total |  | 578 | 349 |

The lipide and phosphorus contents of this glycoprotein is not more than 0.1% and it does not contain fats or nucleic acids. It tends to loose its activity in an alkaline solution, and its activity demonstrates a pronounced decline when treated for three hours at a pH above 10. It is stable in an acid solution, no change at all being observed even though it is treated for three hours at a pH 1.5. It is also relatively stable against digestive enzymes. The invention glycoprotein is a novel substance differing from the other known protein substances which are present in saliva and the salivary glands.

As previously noted, parotin and the parotin-like substances such as S-parotin and salivaparotin, and NGF are simple proteins, which differ also from the invention glycoprotein in respect of their isoelectric point. On the other hand, alpha-parotin and beta-parotin differ from the invention glycoprotein in respect of their isoelectric point as well as sugar content.

Aside from the foregoing parotins and NGF, it is known that saliva and salivary glands contain such enzymes as amylase, lyzozyme and protease and such biologically active substances as callicrein. However, all of these are simple proteins not containing sugars and differ from the invention glycoprotein in their chemical properties. From the fact that the foregoing enzymatic and biological activities are not observed in the invention glycoprotein itself and, in contrast thereto, from the view point that the foregoing substances do not demonstrate the anti-gastric acid secretory and anti-ulcerative activities at all, it is clear that the invention glycoprotein is a novel substance. Further, no anti-gastric acid secretory or anti-ulcerative activity whatsoever is observed in any of the parotins and their analogous substances or in NGF, too.

When the gastric acid secretion and gastric ulceration inhibitory effects of the glycoprotein obtained by the invention method were investigaed by using pylorus-ligated rats, it was found in the case of gastric secretion that by the administration of 500 μg./kg. of rat weight of saliva-derived purified glycoprotein, there was a decrease, after 6 hours of ligature, of 67% in the amount of gastric secretion, 76% in the free acidity and 35% in the total acidity, as compared with those of the control group. On the other hand, as regards the ulceration of the anterior region of the stomach, no ulcerations occurred at all even after 20 hours of ligature, as compared with the occurrence of ulcerations in the control group even after only 12 hours of ligature.

On the other hand, when 5 mg./kg. of salivary gland-derived glycoprotein were similarly administered to pylorus-ligated rats, there was a decrease, after 6 hours of ligature, of 76% in the amount of gastric juice, 88% in the free acidity and 44% in the total acidity, as compared with the control group. Further, the occurrence of ulcerations in the anterior region of the stomach was completely inhibited even after 20 hours of ligature.

As a result of these experiments in which pylorus-ligated rats were used, it is clear that the purified glycoprotein of saliva and salivary glands possesses a pronounced gastric acid secretion as well as ulceration inhibitory effects.

Next, when the effect on the inhibition of restraint ulcer was examined by an experiment with rats, it is as shown in Table II, that when saliva-derived purified glycoprotein was administered in a dose of 2 mg./kg., the incidence of ulceration was 40% and most cases were of slight condition, as compared to the control group in which the incidence was 100%, all of which were of serious condition. Even with an administration of 0.5 mg./kg., the incidence was 65%, most of which were of slight condition.

TABLE II.—THE INHIBITORY EFFECTS OF PURIFIED GLYCOPROTEIN ON RESTRAINT ULCERS OF RAT

| Sample Dosages, mg./kg. B.W. | Animal Numbers | Lesion [1] Incidence Number, percent | Lesion [2] Morphological Orders (Numbers of animals) | | | | |
|---|---|---|---|---|---|---|---|
|  |  |  | − | + | ++ | +++ | ++++ |
| Saline (Control) | 20 | 20 (100) | 0 | 0 | 4 | 9 | 7 |
| Purified Glycoprotein obtained from Saliva: |  |  |  |  |  |  |  |
| 2.0 | 20 | 8 (40) | 12 | 3 | 5 | 0 | 0 |
| 0.5 | 20 | 13 (65) | 7 | 2 | 7 | 0 | 4 |
| Purified Glycoprotein obtained from Glands: |  |  |  |  |  |  |  |
| 20.0 | 20 | 6 (30) | 14 | 2 | 2 | 2 | 0 |
| 5.0 | 20 | 12 (60) | 8 | 5 | 5 | 2 | 0 |

[1] Number and percentage of animals showing at least one focalized lesion, ulcer or focus, accompanied with significant circulatory disturbances.
[2] These signs are defined as follows:
−—No significant focalized lesions (ulcer, foci, hyperemia, edema, erosion and hemorrhagic coating).
+—Slight focalized lesion, significant hyperemia but not reach hemorrhagic coating.
++—Significant focalized lesion (no ulcer) hemorrhagic coating, below 1 mm. size.
+++—Significant focalized lesion (ulcer) not expanded over ⅓ area of stomach.
++++—Significant focalized lesion (ulcer) expanded over ⅓ area of stomach.

On the other hand, in the case of the purified glycoprotein obtained from salivary glands, the incidence of ulcers was 30% by an administration of 20 mg./kg. and 60% by an administration of 5 mg./kg., both of which were slight cases. It is thus clear that the purified glycoprotein obtained from saliva as well as salivary glands demonstrates a pronounced effect in inhibiting the incidence of restraint ulcers.

The novel glycoprotein of the present invention can be used in relief of various gastric diseases by incorporating a therapeutically effective amount thereof with a pharmaceutically acceptable carrier after dry freezing of the glycoprotein. The therapeutically effective amount is considerably varied depend on symptoms, body-weight, administration times and the like. Generally speaking, an amount ranging from 0.1 to 100 mg. is optionally selected as one dosage. The novel glycoprotein of the present invention is applied to patients by means of oral administration or intramuscular injection. In the case of oral administration, the novel glycoprotein of the present invention is administered in a form of granules, tablets or pills prepared by employing lactose, starch, talc and the like as a carrier, or in a state charged into a gelatin capsule. In the case of intramuscular injection, frozen dry powder of the glycoprotein is dissolved into a physiological solution of sodium chloride or sterilized distilled water, and the solution is applied to patients.

EXAMPLE 1

Ten liters of human saliva are centrifuged, following which its pH is adjusted to 5.4 by adding to its upper layer 5 N-HCl with stirring under cooling conditions and thereafter allowed to stand overnight in a refrigerator. The resulting precipitates are eliminated by centrifuging and, after adjusting the pH of the solution to 4.6 by a further addition of 5 N-HCl to its upper layer, it is allowed to stand overnight in a refrigerator. The resulting precipitates are eliminated and the solution is adjusted to a pH of 7 by adding to its upper layer 5 N-NaOH with stirring.

One liter of a 0.3 mole solution of $ZnCl_2$ is added to 10 liters of the foregoing solution with stirring under cooling conditions, after which the solution is allowed to stand overnight in a refrigerator. The resulting precipitates are separated by centrifugation. A fourfold amount of 1–3% sodium citrate solution is added to these precipitates and extraction thereof is carried out for 2 hours.

The liquid extract is centrifuged and to the precipitates, a further addition of a fourfold amount of 1% sodium citrate solution is made followed by extraction for one hour. Centrifugation is similarly carried out to separate liquid extract which, after being commingled with the first liquid extract, is poured into a cellophane tube and dialyzed against running water for 48 hours.

1.25 grams of NaCl is added to 250 ml. of the dialysate followed by the addition of 107 ml. of acetone with stirring under cooling conditions to make the concentration 30%, after which the solution is allowed to stand overnight.

The resulting precipitates are eliminated by centrifuging and the supernatant is brought to a concentration of 60% by a further addition of acetone. The precipitates which form as a result of standing the supernatant overnight are separated by centrifugation. A saturated ammonium sulfate solution is added to a solution of these precipitates in a fivefold amount of water to bring the saturation of the solution to a 0.5 saturation (24 w./w. percent). The pH of the solution is then adjusted to neutral, after which it is left standing overnight in a refrigerator. The precipitates which have deposited are collected by either centrifugation or filtration and, after being dissolved in a small quantity of water, the solution is placed in a cellophane tube and dialyzed against distilled water. When, after several changes of the outer liquid, the dialysate is lyophilized, a saliva-derived glycoprotein powder is obtained in an amount of one gram.

For homogenizing this purified glycoprotein powder, any of the various techniques that are used customarily in purifying proteins can be employed. If, by way of illustration, one is described, the following method is useful.

After thoroughly washing 30 grams of a DEAE-cellulose with distilled water, the DEAE-cellulose is packed in a 4 x 40 cm. column and buffered by passing a phosphoric acid buffer solution of a pH 7.4 and finally a 0.01 mole phosphoric acid buffer solution.

One gram of the aforesaid purified glycoprotein powder is dissolved in a small quantity of a 0.01 mole phosphoric acid buffer solution and charged to the column, following which a 0.01 mole phosphoric acid buffer solution and then a 0.05 mole phosphoric acid buffer solution are passed through the column, and the unexchanged or eluted non-effective substances are removed. Now, when a 0.05 mole phosphoric acid buffer solution to which has been added 0.5 mole of NaCl is passed through the column, the effective substance will be eluted. This eluted solution is separately collected with a fraction collector into 5 ml. portions and the optical absorption at 280 m$\mu$ of these portions are determined. When only those portions showing a protein signal peak are collected, concentrated under reduced pressure, dialyzed and thereafter the dialysate is lyophilized, first-stage purified powder of the glycoprotein is obtained.

Next, after thoroughly swelling Sephadex G-75 (crosslinked dextran) with water, it is packed in a 2.5 x 50 cm. column. After the Sephadex has been fully equilibrated by passing a 0.05 M $NH_4HCO_3$ solution through the column, a solution in which 120 mg. of the glycoprotein powder purified by the hereinbefore described ion-exchange chromatographic method is dissolved in a small quantity of a 0.05 M $NH_4HCO_3$ solution, is charged and developed and eluted with the same $NH_4HCO_3$ solution.

When the eluted solution is separately collected every 3 ml. portions and those exhibiting the characteristic protein peak of absorptions at 280 m$\mu$ are collected, they can be divided into three components. Since the effective substance is only contained in the first component, this portion only is concentrated under reduced pressure and frozen and dried, and thereby obtained purified powder of the glycoprotein in the second-stage.

Next, as the third stage, after repeatedly washing about 400 grams of starch first with N—HCl and then with distilled water, the starch is buffered thoroughly in 0.05 M veronal buffer at a pH 8.6 followed by repeated stirring and decantations to make it in a pasty mass. By pouring the so obtained pasty mass into a 1.5 x 7 x 40 cm. cell, a starch block is prepared.

One hundred mg. of the purified glycoprotein powder obtained in the hereinbefore described in the second stage are dissolved in a small quantity of veronal buffer followed by adding starch thereto to form a pasty mass. This pasty mass is embedded in the middle of the starch block, and the starch block electrophoresis is carried by either the horizontal or vertical method by passing an electric current using veronal buffer as the electrode solution.

After conducting the electrophoresis in a low temperature chamber for 20 hours with 2 ma./cm.$^2$, the starch block is cut into pieces 0.5 cm. in width, and each of the small starch pieces is extracted with 10 ml. of water. After removing the starch by filtration, the absorption at 280 m$\mu$ of the filtrates is determined. Those portions exhibiting the characteristic protein peak are collected.

The active substance is only contained in the liquid extraction obtained from the starch block 5–7 cm. in the plus direction from the origin. Hence, when this portion is concentrated under reduced pressure dialized and the dialysate is frozen and dried, the purified powder of glycoprotein in the third-stage is obtained.

This purified product exhibits a single migratory figure during the electrophoresis with polyacrylamide gel as carrier and thus a homogeneous glycoprotein is obtained.

The yield from one gram of the salvia-derived purified gylcoprotein is 50 mg. (5 mg. per liter of salvia) and the rise in the antigastric acid secretory activity is ten times.

EXAMPLE 2

Fifty liters of saliva from which residue has been removed by centrifugation are concentrated to 10 liters under reduced pressure at 30° C. Ten liters of this concentrated saliva are then treated as in Example 1 to obtain 15 grams of the saliva-derived purified glycoprotein.

The homogenization operation is carried out as in Example 1.

EXAMPLE 3

To 100 liters of saliva (or 20 liters of concentrated saliva) are added 200 liters of acetone (40 liters in the case of concentrated saliva), and after standing overnight the precipitates are separated by centrifugation.

Two hundred grams of the so obtained dry powder are extracted with 10 liters of water (or 0.9% NaCl solution) for 3 hours while maintaining the pH in the neighborhood of 8.

EXAMPLE 4

Salivary glands of animals (parotid, submaxillary and sublingual glands), after being removed of their fat and other tissues, are ground, following which one kg. of the ground glands is extracted with a fivefold amount of water (or 0.9% NaCl solution) for 3 hours while maintaining the pH in the neighborhood of 8 with NaOH solution followed by centrifugation to obtain a liquid extract.

The operation described in Example 1 are carried out on this liquid extract.

Similar results are also obtained when an acetone-dried powder of the glands is used instead of the ground glands.

The yield and the rise in activity of the glands-derived purified glycoprotein powder after fractional precipitation as well as those of a homogenized glycoprotein powder obtained by carrying out the additional three-stages purification operation as in Example 1 are shown in Table III.

TABLE III.—YIELD AND ACTIVITY OF THE NOVEL GLYCOPROTEIN OBTAINED FROM SALIVARY GLANDS

| | Novel Glycoprotein | | | |
| --- | --- | --- | --- | --- |
| | Purified | | Homogenized | |
| Glands | Yield [1] (mg.) | Activity [2] (μg.) | Yield [1] (mg.) | Activity [2] (μg.) |
| Parotid | 100 | 1,000 | 0.5 | 10 |
| Submaxillary | 700 | 1,000 | 3.5 | 10 |
| Sublingual | 1,000 | 1,000 | 5.0 | 10 |

[1] Per kilogram of glands.
[2] Per 200 grams body weight of rat, minimum effective dose of antisecretory activity in the pylorus-ligation method.

We claim:

1. A method of collecting a glycoprotein having gastric acid secretion inhibiting activity and antiulcerative activity which comprises the steps of (a) extracting saliva of man or other mammals or the salivary glands of mammals other than man with an aqueous medium having a pH of 6–8 selected from the group consisting of water, a weakly alkaline water and saline, (b) acidifying the aqueous extract of saliva or salivary glands to a pH of 5.4–5.6 and after removing undesired precipitates adjusting the pH to 4.5–5.6 to again remove undesired precipitates, (c) adding a water-soluble zinc salt to the resultant mother liquor until its concentration in the solution is within the range of 0.01–0.05 molar concentration to precipitate a complex of the zinc salt and glycoprotein, adding a chelating agent for zinc to the so formed precipitate, redissolving the precipitate in an aqueous medium and subjecting the so obtained solution to a dialyzing treatment to eliminate the chelate of zinc, (d) adding to the resultant solution a water-miscible organic solvent to adjust its concentration to about 30 volume percent so as to eliminate precipitated inactive proteins adding additional water miscible organic solvent to the filtrate such that the concentration of said solvent is between 30 and 60 volume percent in order to obtain a precipitate of the desired active glycoprotein, collecting said precipitate and redissolving the collected precipitates in an aqueous medium, (e) adding to the resulting solution a sulfate of ammonia or an alkali metal to adjust its concentration to about 0.5 saturation, collecting the resulting precipitate and redissolving the precipitate in an aqueous medium and subjecting the resulting solution to a dialyzing treatment to eliminate the sulfate of ammonia or an alkali metal.

2. The method according to claim 1 wherein the salivary glands are parotid or sublingual glands of mammals.

3. The method according to claim 1 wherein said water-soluble zinc salt is selected from the group consisting of zinc chloride and zinc acetate.

4. The method acording to claim 1 wherein said chelating agent for zinc is selected from the group consisting of sodium citrate, glycine and ethylenediamine tetraacetic acid.

5. A product produced by the method of claim 1.

6. The product of claim 5 wherein said product is a glycoprotein obtained from saliva or salivary glands, said glycoprotein having a sugar content of 34.9% and a peptide content of 62.6%, having an elemental analysis of H=7.68%, C=42.31%, and N=9.15%, having an isoelectric point at a pH 2.6, having the maximum absorption in the ultraviolet region at a wavelength of 280 mμ, and having a molecular weight of about 150,000, said glycoprotein comprising, lysine, histidine, arginine, aspartic acid, asparagin, glutamic acid, glutamine, threonine, serine, proline, glycine, alanine, valine, isoleucine, leucine, tyrosine, phenylalanine, cystine and tryptophan as amino acid, and galactose, fucose, glucosamine and sialic acid as sugar.

7. A method of collecting a glycoprotein having gastric acid secretion inhibiting activity and anti-ulcerative activity which comprises the steps of (a) extracting the salivary glands of mammals other than man with an aqueous medium having a pH 6–8 selected from the group consisting of water, a weakly alkaline water and saline, (b) acidifying the aqueous extract of salivary glands to a pH of 5.4–5.6 and after removing undesired precipitates adjusting the pH to 4.5–4.6 to again remove undesired precipitates, (c) adding a water-soluble zinc salt to the resultant mother liquor until its concentration in the solution is within the range of 0.01–0.05 molar concentration to precipitate a complex of the zinc salt and glycoprotein, adding a chelating agent for zinc to the so formed precipitate, redissolving the precipitate in an aqueous medium and subjecting the so obtained solution to a dialyzing treatment to eliminate the chelate of zinc, (d) adding to the resultant solution a water-miscible organic solvent to adjust its concentration to about 30 volume percent so as to eliminate precipitated inactive proteins adding additional water miscible organic solvent to the filtrate such that the concentration of said solvent is between 30 and 60 volume percent in order to obtain a precipitate of the desired active glycoprotein, and then collecting said precipitate.

8. The method according to claim 7 wherein the salivary glands are parotid or sublingual glands of mammals.

9. The method according to claim 7 wherein said water-soluble zinc salt is selected from the group consisting of zinc chloride and zinc acetate.

10. The method according to claim 7 wherein said chelating agent for zinc is selected from the group consisting of sodium citrate, glycin and ethylenediamine tetraacetic acid.

11. A product produced by the method of claim 7.

12. A method of collecting a glycoprotein having gastric acid secretion inhibiting activity and anti-ulcerative activity which comprises the steps of (a) extracting saliva of man or other mammals or the salivary glands of mammals other than man with an aqueous medium having a pH of 6–8 selected from the group consisting of water, a weakly alkaline water and saline, (b) acidifying the aqueous extract of saliva or salivary glands to a pH of 5.4–5.6 and after removing undesired precipitates adjusting the pH to 4.5–4.6 to again remove undesired precipitates, (c) adding a water-soluble zinc salt to the resultant mother liquor until its concentration in the solution is within the range of 0.01–0.5 molar concentration to precipitate a complex of the zinc salt and glycoprotein, adding a chelating agent for zinc to the so formed precipitate, redissolving the precipitate in an aqueous medium and subjecting the so obtained solution to a dialyzing treatment to eliminate the chelate of zinc, and (d) adding to the resulting solution a sulfate of ammonia or an alkali metal to adjust its concentration to about 0.5 saturation, collecting the resulting precipitate and redissolving the precipitate in an aqueous medium and subjecting the resulting solution to a dialyzing treatment to eliminate the sulfate of ammonia or an alkali metal.

13. The method according to claim 12 wherein the salivary glands are parotid or sublingual glands of mammals.

14. The method according to claim 12 wherein said water-soluble zinc salt is selected from the group consisting of zinc chloride and zinc acetate.

15. The method according to claim 12 wherein said chelating agent for zinc is selected from the group consisting of sodium citrate, glycine and ethylenediamine tetraacetic acid.

16. A product produced by the method of claim 12.

References Cited

UNITED STATES PATENTS 3,178,349  4/1965  Ito et al. _____ 424—95

OTHER REFERENCES

Chem. Abstracts, vol. 56, 1962, 11716e–f, Teikoku.
Chem. Abstracts, vol. 59, 6207a–c, 6206f–h, Teikoku, 1963.
Chem. Abstracts, vol. 67, 848 57d, Teikoku, 1967.

WILLIAM H. SHORT, Primary Examiner

H. SCHAIN, Assistant Examiner

U.S. Cl. X.R.

424—104, 177